United States Patent [19]

Riem

[11] 3,970,859

[45] July 20, 1976

[54] HYDRO-ELECTRIC GENERATION OF POWER FROM SMALL BODIES OF WATER

[76] Inventor: George Riem, 295 Shuter St., Toronto, Ontario, Canada, M5A1W6

[22] Filed: Jan. 9, 1975

[21] Appl. No.: 539,862

[52] U.S. Cl. .................................... 290/54; 60/397
[51] Int. Cl.² .......................................... F03B 13/10
[58] Field of Search ............ 290/52, 53, 54; 60/325, 60/397, 398

[56] References Cited
UNITED STATES PATENTS

| | | | |
|---|---|---|---|
| 2,962,599 | 11/1960 | Pirkey | 290/54 |
| 3,538,340 | 11/1970 | Lang | 290/54 |
| 3,643,426 | 2/1972 | Janelid | 290/52 |

*Primary Examiner*—Gerald P. Tolin
*Attorney, Agent, or Firm*—K. Maxwell Hill

[57] ABSTRACT

The following specification discloses a means of converting a head of water from a lake into electric power by directing a flow of water onto a turbine disposed in a crib built below the floor of the lake and having intermittent exploding gas means to create a vacuum for drawing the fallen water from below the turbine back into the lake.

4 Claims, 2 Drawing Figures

HYDRO-ELECTRIC GENERATION OF POWER FROM SMALL BODIES OF WATER

The present invention relates to a means for generating electrical energy by the transformation of potential energy in the fall of water against a turbine when the water is drawn from a body of water. A novel turbine means is herein disclosed. The fallen water is withdrawn from the downstream side of a turbine by vacuum means created by the explosive gases in a chamber.

It is a particular object of this invention to use other forms of energy to withdraw water from the downstream side of the generation plant after the fall has been converted by turbine means to electrical energy. It is also an object to build the generating unit, close to where the energy will be consumed thereby avoiding transmission losses.

PRIOR ART

It is well known that the cheapest means of generating electric power is through the use of falling water to drive water wheels and turbines which in turn, through suitable shafting means, create electric power. It is also known that hydro electric installations are normally built on falling bodies of water and employ dams to create a controlled and steady fall of water to utilize the potential energy in the head of water to create the electrical energy. Where the body of water is still or very gently running it has proved uneconomical to create power houses in the stream or body of water for generating electric power from the fall of water from the top to a generator below since it is known that energy must be used to disperse the water that has fallen from the turbine after use.

OBJECTS OF THE PRESENT INVENTION

The present invention provides the creation of an artificial fall of water from a still body of water by excavating and cribbing a power house site below the bottom of the lake or river bottom and installing therein the walls of a power house. Water is drawn through the walls of the crib from the body of water and directed horizontally into a turbine mechanism located at least nine feet below the level of the water. The turbine drives a generator means connected by a shaft above the turbine.

After driving the turbine, the water collects in a pit or basin excavated below the turbine and is drawn off by a conduit means having a pumping means powered by another source of energy. It is known that explosive gases will create vacuums that can be utilized to draw liquids against the force of gravity to fill the evacuated space. In the present invention an open ended conduit is led from the bottom of the pit, where the water from the generator collects, to a tank in the power house having an exit therefrom directed back on to the body of water. The tank has various timing mechanisms associated with it to open and close to allow the exit of explosive gases but to prohibit entrance of atmosphere air. Valve mechanisms are timed to close the stacks when the explosion ceases, thereby to maintain a partial vacuum within the tank. Upon creation of the vacuum and after close of the exit valves the water from the bottom of the pit is allowed to flow by vacuum pressure into the tank until the vacuum has been disipated. Additional valve means are then actuated to close the conduit into the tank and an exit door opened allowing the water to fall back into the body of water.

It has been found that the cost of the energy to create the explosion is less than the cost of the electricity generated by the falling water onto the turbine means of the present invention, thereby allowing for a creation of electrical energy in excess of the consumption of other forms of fuel such as the chemicals reacting to cause the explosive charge within the tank.

It is contemplated that the present invention would be used for small installations at remote locations where there would be no necessity for transporting the electrical energy by transmission lines, thereby saving the expensive transmission losses that are well known in the art. The cost of the installation itself is minimal since the turbine of the present invention is of relatively small dimension and the costs of the cribbing and walls for the power house much less than for a usual power house. The turbine herein described is horizontally oriented in the well with the drive shaft directed upwardly to the generator located above it in the power house.

Water from the lake or river is directed downwardly from the lake through to build up its velocity and then is redirected to strike the turbine in a horizontal plane. The directing means is a pipe which enlarges at the point where it is directed against the turbine to surround the turbine completely. The pipe has, on its inner wall, a multiplicity of spout means which are restricted inwardly to increase the velocity of the water at the point where it leaves the surrounding pipe to strike the veins of the turbine. The water flows both ways around the surrounding pipe chamber to enter the spouts from all sides and simultaneously. When the turbine is in full operation there is a head of water with the pipe chamber full and discharging water with continuous force from the equal jets of water a stabalized and equal force of water is driven against the veins of the turbine to ensure a uniform thrust for the turbine shaft.

With the foregoing in view and such other and further purposes, advantages, or novel features as may become apparent from consideration of this disclosure and specification, the present invention consists of the concept comprised, embodied, embraced or included in any methods, steps, process, construction, composition or arrangement or combination of parts or new use of any of the foregoing which may herein be exemplified in one or more specific embodiments of such concept, reference being had to the accompanying drawings in which similar reference numerals refer to similar parts.

PREFERRED EMBODIMENT OF THE INVENTION

A body of water is selected having a reasonably stable level of water within it and having at least a depth of four yards. A power house is constructed on the shore or within the shoreline of the body of water with impervious walls to keep out the pressure of the lake from collapsing the same, but not of such a massive construction as is normally required for power houses. A pit is dug below the bottom of the lake level, to ensure that a deep enough basin is provided to collect the outflow from the turbine. A platform is then constructed on the bottom of the power house site and a turbine securely mounted thereon to turn in a horizontal plane with its drive shaft directed upwardly. A generator is then installed to receive the shaft from the turbine and thereby to generate electricity therefrom.

The top of the turbine is mounted at a location at least four yards below the water surface of the lake or river. A pipe or conduit is provided with an opening through the power house wall and entering from below the surface level of the water surface of the lake or river. A pipe or conduit is provided with an opening through the power house wall and entering from below the surface level of the water and adapted to draw water from the body of water downwards onto the turbine. The turbine being located in a horizontal plane must have the water directed at its veins from a horizontal direction therefore the conduit or pipe from the body of water is directed horizontally toward the turbine after falling the full yard depth from the water.

A vacuum suction means is set into the basin with an open end in the bottom of the basin and leading upwardly through the power house to a tank located above the surface of the body of water. The tank is created to hold a large quantity of water and is also made to withstand atmospheric pressure upon its outside surface when partially evacuated of gases from within.

A stack means is provided upwardly of the tank with a valve mechanism located therein to shut the tank from outside atmosphere after the gases from an explosive charge set within the tank have escaped but before the low pressure partial vacuum, created within the tank by the explosion, has dissipated. An exit door is also provided on the tank up the suction pipe by the vacuum, to escape.

Figure 2:
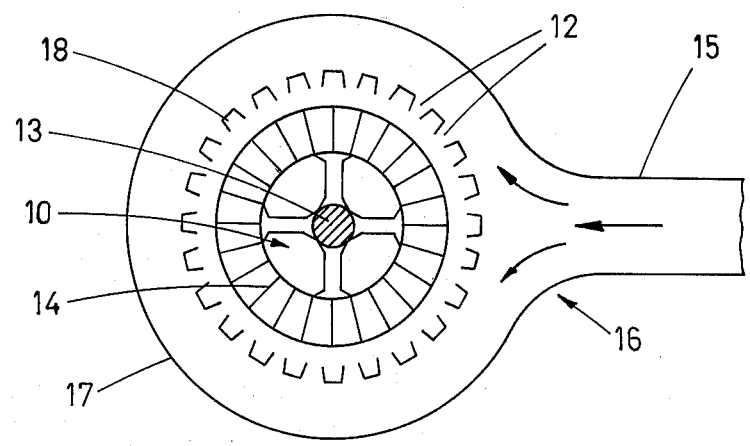
FIG. 2 is a plan view of the turbine showing the restricting jet or spouts comprising the inner wall portion of the chamber described by the directing pipe.

The turbine that is employed in the present invention is shown in FIG. 2 wherein the numeral 10 represents the actual turbine wheel driven about a shaft 13 vertically oriented to drive the generator which is located above it. The veins of the turbine are indicated by numerals 14. The portion of the pipe which directs the water horizontally on to the turbine is shown enumerated 15 and is shown enlarged at 16 where the pipe opens up into a chamber completely surrounding the periphery of the turbine.

The outside walls 17 of the conduit pipe restrain the water from prematurely flowing into the basin of the hydro-generating house. The inner wall 18 comprises a series of small openings 12 which are restricted outwardly towards the turbine, thereby creating spouts or jets of water. The spouts increase the velocity of the water arriving into the conduit chamber and held by the wall 17 to provide uniform force against the turbine.

The following are the steps employed in generating electricity from a small body of water as contemplated in the present invention. 1) a power house is constructed below the level of the bottom of the lake or body of water from which the fall of water is to be drawn. 2) a turbine is constructed to operate at least four yards below the head of the body of water. 3) a generator is located directly above the horizontally placed turbine and connected therewith by shaft means. 4) a syphon means is emersed with an open end in the bottom of the pit or basin and attached to a tank member located above the body of water. 5) a conduit means joins the turbine with the body of water to allow a continuous flow of water from the body of water on to the turbine to propell the turbine and its associated shaft means. 6) a level indicator is located within the basin and actuates an explosion within the tank thereby creating a vacuum and drawing water by vacuum means through the conduit into the tank. 7 ) with dispersion of the vacuum the water is then ejected from the tank back into the body of water, 8) upon the emptying of the tank the exit means is reclosed to provide space for the next explosion.

Figure 1:
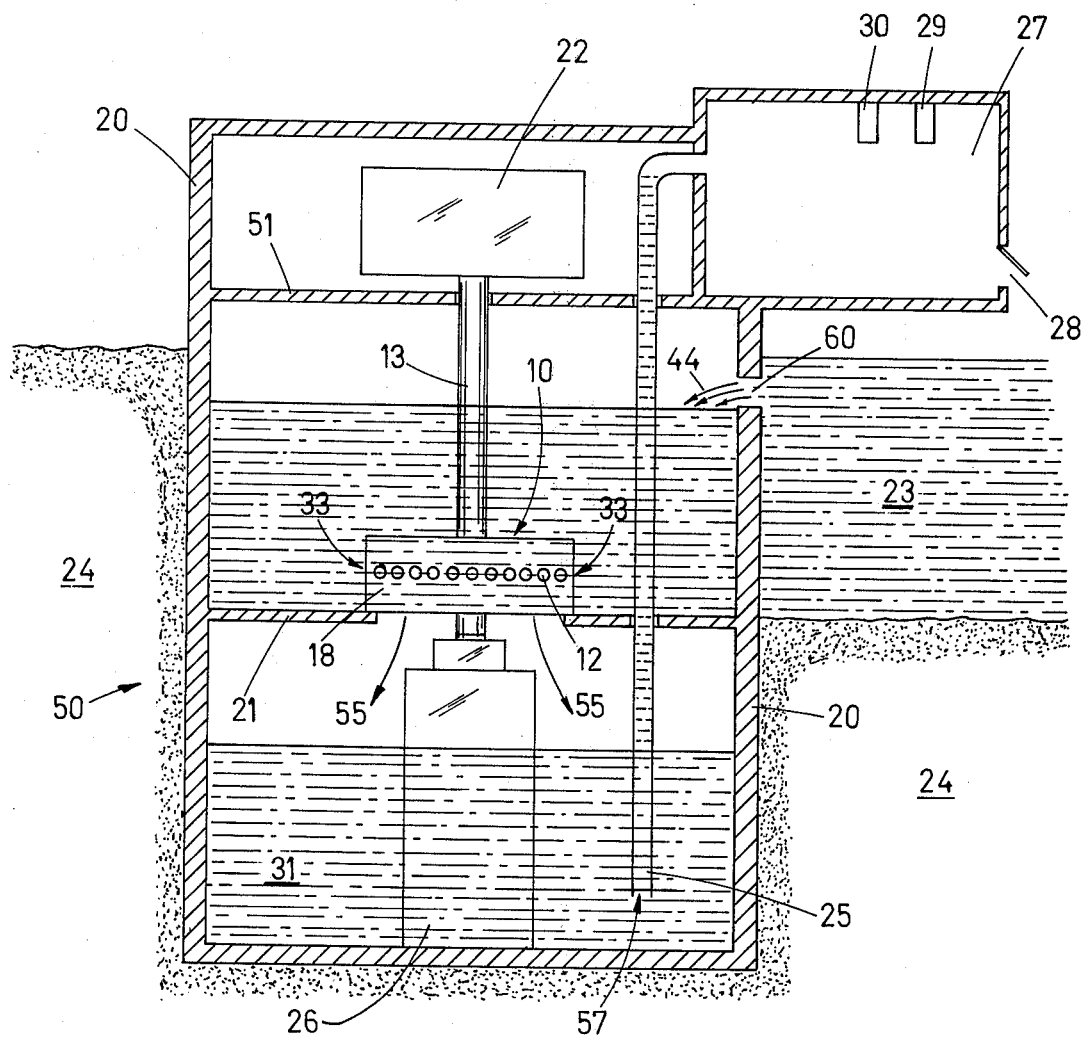
FIG. 1 is a side view of the process herein described.

In FIG. 1, an alternative means of directing the head of water on to the turbine vanes is shown. 20 represents a crib in section and 24 shows the earth into which the power house 50 has been built.

Instead of a pipe 15 directing the water from the body of the lake 23, downward and to surround the turbine within chamber 16, a floor 21 is included in the crib to completely seal the water 44 flowing into the upper portion of the crib from the basin 31 below the turbine.

The steel spout containing wall 18 is now exposed to the upper chamber to receive the flow 33 of the head of water 44 entering from the lake surface. The jets or spouts 12 can thereby serve to direct a uniform force of water onto the vanes of the turbine 10 which then disposes of the water in direction 55 downward into the basin 31.

In FIG. 1, the turbine is shown erected upon pedestal 26 fixed into the basin floor with a shaft 13 connected to a generator 22 fixed to the upper flow 51 of the power house 50.

The vacuum exhaust conduit 25 is shown immersed at one end 57 in the basin 31 and its other end opening into tank 27 situated above the lake 23. The tank 27 has exhaust valves and stacks 29, 30 suitably located above the tank and has a lower discharge door 28 opening into the lake 23.

The above described alternative can be used on the diminutive power generating stations designed by the applicant herein and will have suitable screening means (not shown) to restrain fish, wood chips and the like from entering the opening, 12 in the steel wall 18.

I claim:

1. A means for generating electric energy from a body of water having a depth of at least 4 meters comprising in combination;
   a crib having a basin contained therein and being constructed below the bottom of and adjacent said body of water;
   a turbine fixed within said crib above said basin;
   a means for directing a flow of water from said body of water toward said turbine;
   an electric generator means connected to a shaft means rotated by said turbine;
   a tank member mounted on the upper structure of said crib and above the upper surface level of said body of water and interconnected to said basin by water siphoning means;
   means for alternately creating a vacuum in said tank, drawing water from said basin to fill said vacuum, and then emptying said water from said tank to said body of water.

2. A means for generating electric energy as claimed in claim 1 wherein said turbine is fixed to rotate in a horizontal plane and is surrounded by perforated means to allow the fall of water to be directed onto the vanes of said turbine in jets.

3. A means for generating electric energy as claimed in claim 2, wherein perforated means comprises a wall having a plurality of inwardly directed funnel-shaped spouts aligned therealong whereby each of said spouts is positioned to direct a jet-stream of water against an oppositely facing vane of said turbine.

4. A means as claimed in claim 3, wherein each vane of said turbine has an oppositely facing spout perforating a conduit pipe surrounding said turbine, and wherein said pipe directs a stream of water from said body of water toward said spouts with equal force and volume.

* * * * *